(12) United States Patent
Borzucki

(10) Patent No.: US 6,308,921 B1
(45) Date of Patent: Oct. 30, 2001

(54) TWO-PIPE CLAMP

(75) Inventor: Roman Borzucki, Lebach (DE)

(73) Assignee: Hydac Befestigungstechnik GmbH, Saarbrucken (DE)

(*) Notice: Subject to any disclaimer, the term of this patent is extended or adjusted under 35 U.S.C. 154(b) by 0 days.

(21) Appl. No.: 09/587,615

(22) Filed: Jun. 5, 2000

(30) Foreign Application Priority Data

Jun. 5, 1999 (DE) ............................................. 199 25 772

(51) Int. Cl.[7] .................................................. F16L 3/22
(52) U.S. Cl. .................................. 248/68.1; 248/74.2
(58) Field of Search ........................... 248/68.1, 69, 74.1, 248/74.2, 74.3, 65, 67.5, 67.7, 316.6; 403/391

(56) References Cited

U.S. PATENT DOCUMENTS

| | | | |
|---|---|---|---|
| T100,605 | * 5/1981 | Christian | 248/68.1 |
| 2,354,919 | * 8/1944 | Lockwood | 248/68.1 |
| 2,355,742 | * 8/1944 | Morehouse | 248/68.1 |
| 2,361,943 | * 11/1944 | Issoglio et al. | 248/68.1 |
| 2,404,531 | * 7/1946 | Robertson | 248/68.1 |
| 3,531,071 | * 9/1970 | Kubli | 403/391 |
| 3,856,244 | 12/1974 | Menshen | 248/74.4 |
| 3,982,304 | * 9/1976 | Menshen | 248/68.1 |
| 4,273,465 | * 6/1981 | Schoen | 284/68.1 |
| 5,257,768 | * 11/1993 | Juenemann | 248/68.1 |
| 5,794,897 | * 8/1998 | Jobin et al. | 248/74.4 |

FOREIGN PATENT DOCUMENTS 36 02 625 C1   3/1987 (DE).

* cited by examiner

Primary Examiner—Leslie A. Braun
Assistant Examiner—Kofi Schulterbrandt
(74) Attorney, Agent, or Firm—Roylance, Abrams, Berdo & Goodman, L.L.P.

(57) ABSTRACT

A two-pipe clamp has two clamping bodies forming a pair of clamping cheeks, and between them form two passages, each intended for a tubular body. The clamping bodies can be pressed against one another by a tightening screw extending between the passages from a top cover plate to a base plate. The pair of clamping cheeks are held between the two plates. Each clamping body is framed by an exterior security strip forming a reinforcement. Each strip has a central segment extending between the cover plate or the base plate and the relevant clamping bodies. Bent end legs or the security strips extend along the relevant open side surfaces of the clamping bodies. The lengths of these legs are determined, so that upon the pressing of the clamping bodies, engagement of the leg ends limits their clamping force.

7 Claims, 2 Drawing Sheets

TWO-PIPE CLAMP

FIELD OF THE INVENTION

The present invention relates to a two-pipe clamp or clip with two clamping bodies forming a pair of clamping cheeks. Between the cheeks two passages are formed, with each passage intended for a tubular body. The cheeks can be pressed against one another by at least one tightening screw extending between the passages from a cover plate on the top end to base plate. The pair of clamping cheeks are held between the cover and base plates.

BACKGROUND OF THE INVENTION

Pipe clamps for two pipes are known commercially, and are disclosed in DIN 3015, Part 3. With pipe clamps of this structural type, only rigid materials are considered for the production of the plastic bodies forming the clamping cheeks, for example, polypropylene plastics of PA (polyamide) materials, because the force resulting from the tightening torque generated by the tightening screw is transferred directly onto the clamping bodies and the inserted and clamped pipes or similar conduit systems. When materials of low inherent stability are used, the omission of a limiting device for the tightening torque risks deformation or damage to the pair of clamping cheeks if the tightening torque is too high. On the other hand, when the tightening torque is too low, the clamped pipes could burst forth from the side of the clamping arrangement.

However, the use of rigid materials for the clamping bodies, due to the poor sound and vibration stabilization or attenuation of the rigid materials, is not advantageous. Also, sensitive pipes or other types of conduit systems can be damaged by being clamped between hard or rigid plastic bodies.

SUMMARY OF THE INVENTION

Objects of the present invention are to provide a two-pipe clamp with improved operation properties.

The foregoing objects are basically attained by a two-pipe-clamp comprising first and second clamping bodies defining first and second passages therethrough, each for receiving a tubular body. Each clamping body has an outer end surface, two side surfaces extending from the outer end surface and an inner end surface having recesses defining the passages. The passages are spaced from said side surfaces. A top cover plate is adjacent the outer end surface of the first clamping body. A base plate is adjacent the outer end surface of the second clamping body. A tightening screw extends through the clamping bodies between the passages, and extends from the cover plate to the base plate. First and second securing strips each have a central segment and two bent legs extending from opposite sides of the respective central segment. The central segments of the first and second security strips extend between the cover plate and the first clamping body and between the second clamping body and the base plate, respectively. The legs extend along the side surfaces and have leg ends remote from the respective central segments. The respective ends of the first and second security strips face one another and engage one another to limit compression of the clamping bodies and clamping forces thereof.

The framing of the pairs of clamping bodies provided in the present invention permits the use of softer materials for construction of the pair of clamping bodies, without generating the risk of the pipe or similar conduit systems bursting forth from the side upon loading or under stress. The desired beneficial damping or attenuating properties are also obtained. The security strips also limit the clamping force by the cooperation of the legs at the sides of the frames. The risk of deformation or damage to the pair of clamping bodies is also avoided, which could otherwise result from the force produced by excessive torque from the tightening screw.

The security strips are preferably formed by a C-shaped bent sheet of metal, preferably sheet steel.

A thermoplastic elastomer, for example, a synthetic rubber, can be provided as the material for the clamping body. The Shore hardness of that material preferably lies in the range of approximately 50 to 75.

The two-pipe clamp according the present invention can be provided with a base plate serving as a welding plate. On the interior of the base plate, a nut can be provided for cooperation with the tightening screw.

Alternatively, the base plate can be formed by a supporting rail in the form of a hollow profile with a longitudinal slot. In this case, the tightening screw works in cooperation with a supporting rail nut which extends through the longitudinal slot and out of the interior space of the hollow profile in which is held a bayonet foot of the supporting rail nut.

Other objects, advantages and salient features of the present invention will become apparent from the following detailed description, which, taken in conjunction with the annexed drawings, disclose a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
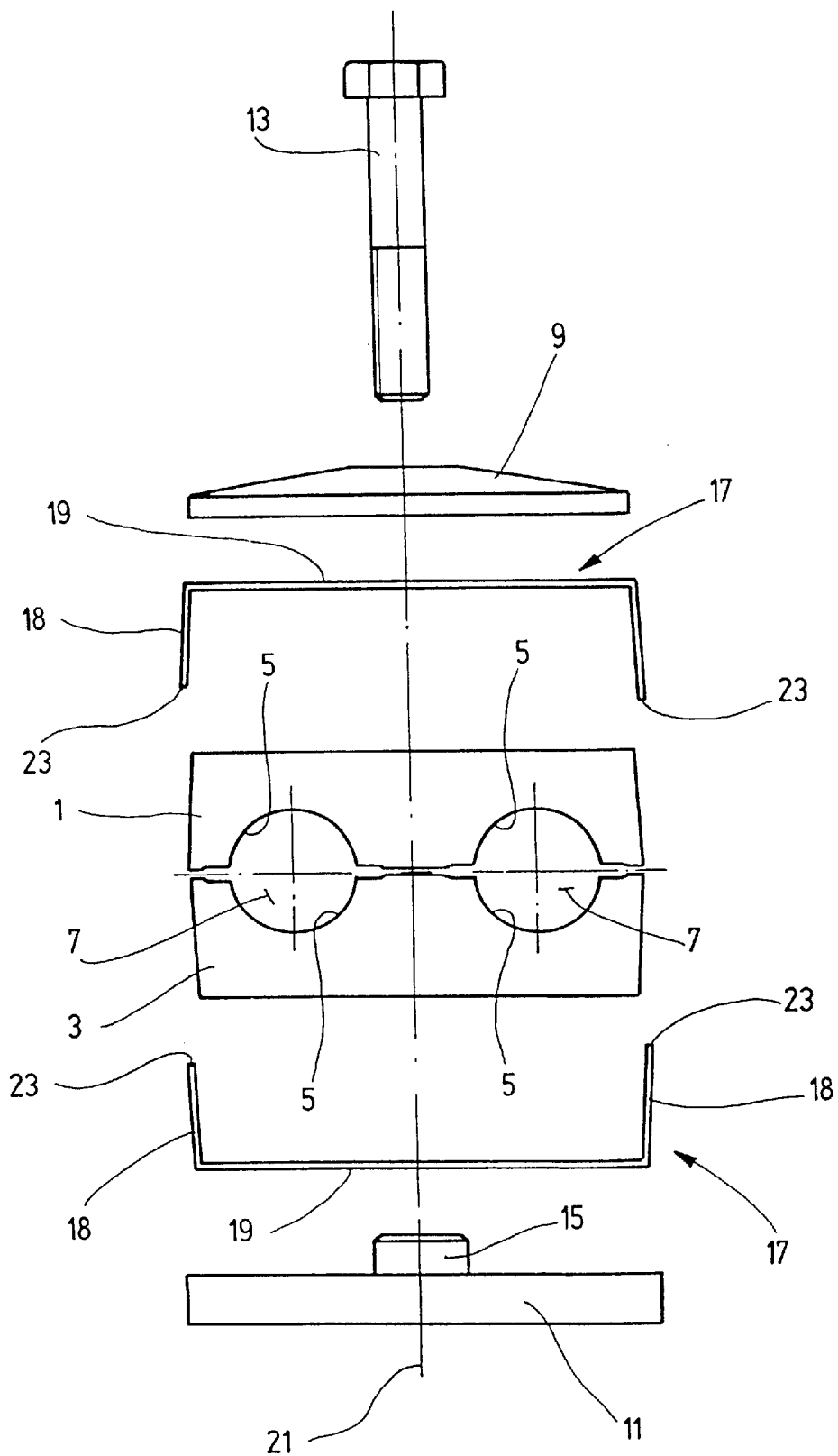
FIG. 1 is an exploded, front elevational view of a two-pipe clamp with a base plate in the form of a welding plate according to an embodiment of the present invention.
Figure 2:
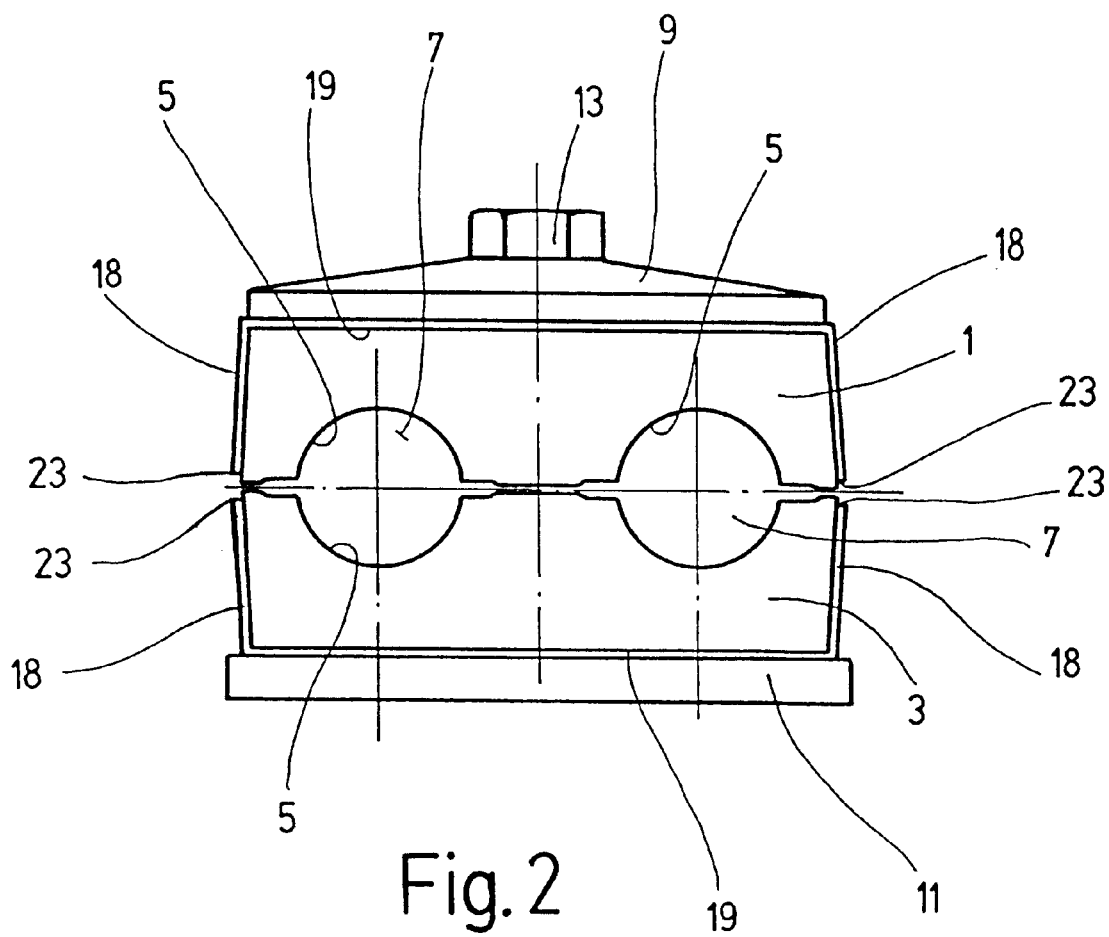
FIG. 2 is a front elevational view of the pipe clamp of FIG. 1 in an operational state.
Figure 3:
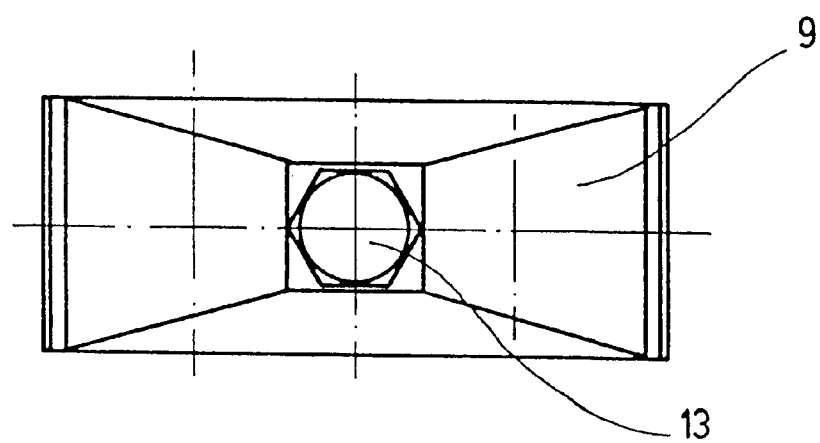
FIG. 3 is a top plan view of the pipe clamp of FIGS. 1 and 2.

A clamping body is formed of a pair of clamping cheeks 1 and 3 produced of a thermoplastic elastomer. The clamping cheeks are configured to be identical and are formed so that when assembled as shown in FIGS. 1 and 2, they define two passages 7 formed by a cut-out recesses 5 between them. The recesses are arranged one adjacent to the other and are each provided to receive a tubular body (not shown). The tubular bodies can be pipes, hoses or other conduit systems. The pair of clamping bodies 1 and 3 is held between a top cover plate 9 and a bottom base 11. A tightening screw 13, with an exterior hexagonal head, extends through a bore in the center of cover plate 9 and a passage (not shown) extending through clamping bodies 1 and 3 in alignment therewith and extending as far as an adjusting nut 15. Nut 15 is fastened to the interior of base plate 11 turned toward the pair of clamping cheeks.

Between cover plate 9 and the surface of clamping body 1 facing the cover plate as well as between base plate 11 and the surface of clamping body 3 facing the base plate, a security strip 17 of sheet metal is located at each interface. In its central segment 19, which extends respectively along cover plate 9 and along base plate 11, an opening is positioned and aligned with the axis 21 of tightening screw 13. Each opening (not shown) facilitates the passage of tightening screw 13 and/or adjusting nut 15 through the relevant security metal strip 17.

The two identically configured security strips 17 each have at the two ends of its central segment 19 upwardly or downwardly bent legs 18. When the pipe clamp is in an operational state, as shown in FIG. 2, legs 18 form a side frame around clamping bodies 1 and 3. They engage adapting to the side surfaces of clamping bodies 1 and 3 which are perpendicular to the frontal surface incorporating the passages 7. The lengths of legs 18 of security strips 17 formed in this embodiment of sheet steel are determined such that the gaps shown in FIG. 2 between the ends of legs 18 facing one another are closed with tightening of tightening screw 13. A tightening torque is reached by which the elastomer clamping bodies 1 and 3 are pressed together to the desired torque magnitude. In other words, ends 23 of the two security strips 17 engage one another as soon as the tightening torque of tightening screw 13 has generated a certain defined magnitude of stress on the pair of clamping cheeks, thereby limiting that stress. With the elastomer material of the pair of clamping cheeks, as optimal clamping of the tubular bodies in passages 7 can be assured. Any danger of damage to sensitive pipes or systems is avoided. As a result of the side framing and reinforcement of the pair of clamping cheeks, the danger of the pipes or conduit systems bursting forth through the sides because of the stress is simultaneously avoided, even when soft materials are used for the pair of clamping cheeks. Such soft materials can be thermoplastic elastomers with Shore hardness in the range of approximately 50 to 75. Very good damping properties are thus also attained, relative to oscillations and relative to noises.

In the illustrated embodiment, base plate 11 is in the form of a welding plate with tightening nut 15 securely mounted thereon. Alternatively the base plate could be formed by a supporting rail provided for suspension of the pipe clamp, in the form of a profiled rail incorporating an interior hollow space having an opening in the form of a longitudinal slot. In such case, the tightening nut cooperates with tightening screw 13 in which, generally with pipe clamps and in a known manner, a bayonet foot is provided which is anchorable and removable in the interior space of the hollow profile, and extends out of the interior space of the supporting rail through its longitudinal slot to the exterior, in order to project through the opening in the central segment 19 of the adjacent security rail 17.

While a particular embodiment has been chosen to illustrate the invention, it will be understood by those skilled in the art that various changes and modifications can be made therein without departing from the scope of the invention as defined in the appended claims.

What is claimed is:

1. A two-pipe clamp, comprising:

first and second clamping bodies defining first and second passages therethough, each for receiving a tubular body, each said clamping body having an outer end surface, two side surfaces extending from said outer end surface thereof and an inner end surface having recesses defining said passages, said passages being spaced from said side surfaces;

a top cover plate adjacent said outer end surface of said first clamping body;

a base plate adjacent said outer end surface of said second clamping body;

a tightening screw extending through said clamping bodies between said passages and extending from said cover plate to said base plate; and first and second security strips, each of said security strips having a central segment and two bent legs extending from opposite sides of the respective central segment, said central segments of said first and second security strips extending between said cover plate and said first clamping body and between said second clamping body and said base plate, respectively, said legs extending along said side surfaces and having leg ends remote from the respective central segments, the respective ends of said first and second security strips facing one another and engaging one another to limit compression of said clamping bodies and clamping forces thereof.

2. A two-pipe clamp according to claim 1 wherein each of said security strips are formed by a C-shaped bent metal sheet.

3. A two-pipe clamp according to claim 2 wherein said metal sheet is a steel sheet.

4. A two-pipe clamp according to claim 1 wherein said clamping bodies are resilient.

5. A two-pipe clamp according to claim 4 wherein said clamping bodies are formed of a thermoplastic elastomer.

6. A two-pipe clamp according to claim 5 wherein said clamping bodies have a Shore hardness between about 50 and about 75.

7. A two-pipe clamp according to claim 1 wherein said base plate comprises a welding plate facilitating welding thereof to another structure; and a nut is mounted on an interior surface of said base plate and threadly receives said tightening screw.

* * * * *